(12) United States Patent
Moran, Jr.

(10) Patent No.: US 9,161,522 B2
(45) Date of Patent: Oct. 20, 2015

(54) FISHING LURE

(71) Applicant: John Denis Moran, Jr., Laguna Vista, TX (US)

(72) Inventor: John Denis Moran, Jr., Laguna Vista, TX (US)

( * ) Notice: Subject to any disclaimer, the term of this patent is extended or adjusted under 35 U.S.C. 154(b) by 171 days.

(21) Appl. No.: 14/055,176

(22) Filed: Oct. 16, 2013

(65) Prior Publication Data

US 2014/0033601 A1 Feb. 6, 2014

Related U.S. Application Data

(63) Continuation-in-part of application No. 13/913,081, filed on Jun. 7, 2013.

(60) Provisional application No. 61/730,359, filed on Nov. 27, 2012, provisional application No. 61/661,536, filed on Jun. 19, 2013.

(51) Int. Cl.
*A01K 85/00* (2006.01)
*A01K 85/14* (2006.01)

(52) U.S. Cl.
CPC ........................................ *A01K 85/14* (2013.01)

(58) Field of Classification Search
USPC .................... 43/42.39, 42.5, 42.45
See application file for complete search history.

(56) References Cited

U.S. PATENT DOCUMENTS

| | | | | |
|---|---|---|---|---|
| 1,546,105 A | * | 7/1925 | Powell | 43/42.37 |
| 2,246,850 A | * | 6/1941 | Housberg | 43/42.39 |
| 2,319,026 A | * | 5/1943 | Adam | 43/42.17 |
| 2,463,889 A | * | 3/1949 | Lundemo | 43/42.39 |
| 2,795,076 A | * | 6/1957 | Luft | 43/42.39 |
| 3,126,661 A | * | 3/1964 | Phillips | 43/42.39 |
| 3,305,964 A | * | 2/1967 | Wieszeck | 43/42.03 |
| 3,461,595 A | * | 8/1969 | Roes | 43/42.39 |
| 3,662,485 A | * | 5/1972 | Klemkowski, Jr. | 43/42.34 |
| 3,724,117 A | * | 4/1973 | Flanagan, Jr. | 43/42.24 |
| D282,391 S | * | 1/1986 | Trisch | D22/129 |
| 4,926,577 A | * | 5/1990 | Radtchenko | 43/42 |
| 6,301,823 B1 | * | 10/2001 | Monticello et al. | 43/42.5 |
| D653,725 S | * | 2/2012 | Zolotuhin | D22/144 |
| 2005/0246940 A1 | * | 11/2005 | Jones et al. | 43/42.5 |
| 2012/0167446 A1 | * | 7/2012 | Ul'Yanov | 43/42.03 |
| 2014/0165449 A1 | * | 6/2014 | Yelton | 43/42.02 |

* cited by examiner

*Primary Examiner* — Christopher P Ellis
(74) *Attorney, Agent, or Firm* — Plager Schack LLP

(57) ABSTRACT

A fishing lure configured to have a rocking motion when pulled through water. The fishing lure has a body shaped like an elliptic parabaloid. A hook is mechanically coupled to the body and to an egg sinker wherein the egg sinker is proximate one end of the body. A sealer is configured to cover the body and the hook. The egg sinker causes the body to sink mimicking a fish diving. The body is configured to have the rocking motion when moving mimicking the fish swimming.

2 Claims, 3 Drawing Sheets

FISHING LURE

RELATED APPLICATION

This application claims priority to provisional patent application U.S. Ser. No. 61/730,359 filed on Nov. 27, 2012 and is also a continuation-in-part of U.S. patent application Ser. No. 13/913,081 filed on Jun. 7, 2013 which, in turn, claims priority to provisional patent application U.S. Ser. No. 61/661,536 filed on Jun. 19, 2012, the entire contents of all of these applications is herein incorporated by reference.

BACKGROUND

The embodiments herein relate generally to devices used to catch fish.

When catching fish there are several advantages of using a lure as opposed to using bait: Lures are less messy than bait. Lures gut hook fewer fish (gut hooking is when the fish takes the hook deeply, or even completely swallows the hook). Lures allow the fisher to cover more water, even from shore or a pier. The fisher can target the species you are after more efficiently with lures, and lures are easy to change out.

There are at least seven kinds of fishing lures: jigs, spinners, spoons, soft plastic baits, plugs, spinerbaits, and flies. A jig has a weighted lead head, comes in every size and color and can be dressed in feathers, hair, a soft plastic grub, or with bait. A spinner is a metal shaft with spinning blade. Soft plastic baits are created by pouring liquid plastic into a mold and adding dyes, metallic flakes, or scents. These can resemble the natural forage of fish, like worms, crawfish, lizards or frogs. Plugs are constructed from hollow plastic or wood to resemble baitfish, frogs or other prey. They usually sport two or three treble hooks. A spinnerbait is an awkward looking fishing lure, consisting of a safety-pin like wire attached to a lead head body. The body usually is dressed with a rubber skirt and the arm with one or two metallic blades like those seen on spinners. Flies are very light lures that imitate insects in various stages of their life cycle, or other natural prey such as baitfish, leeches, hoppers or even mice and frogs. Prior to embodiments of the disclosed invention a spoon was a curved metal lure.

Prior to the disclosed invention, conventional spoons were made of metal for largely historical reasons, the first spoons were literally broken off ends of a spoon. This is because metal sank and could be configured to look like a spoon that reflected light and would be easy to catch fish. There was an attempt to make a wooden spoon lure briefly in the 1920's. See R. Lewis, *Classic Fishing Lures: Identification and Price Guide*, p. 293 (2011). Paul Bunyan Company made "The Dinky" a ⅟₂₀ ounce wooden spoon with a feather hackle or fly in four colors. This project was scrapped after a year because making curved wood that sank was impossible for The Dinky. Embodiments of the present invention solve this problem.

Metal spoons are heavy and sink too quickly for fish to see and track the metal spoon. Metal spoons must be worked too quickly in shallow water and this rapid movement does not allow fish to see or track them. Metal spoons, if worked too slowly, become ensnarled in grass. Metal spoons, if worked too fast, come to the surface and become ineffectual. Fishing in shallow, grassy waters ranging from four to eight inches was difficult. Metal spoons become ensnarled and fouled.

There has been some research done recently on spoons made from plastic injection molding. The prior art includes: U.S. Patent Application 2007/0169397 filed by Mieczkowski; U.S. Pat. No. 7,114,285 issued to Ince; and U.S. Pat. No. 7,162,829 issued to Braaten.

Ince and Braaten teach a lure made from a plastic working process that can also be theoretically made from wood. However, there is no teaching of a sinker embedded in the spoon, therefore the lures would not sink and spin in the water. Ince and Braaten due not claim that this structure or functionality exist in their lures. Rather, they are using surface lures that move along the surface and are for simply a different kind of fishing. Mieczkowski teaches a plastic lure with a different shape to obtain different movement in water.

SUMMARY

A fishing lure configured to have a rocking motion when pulled through water. The fishing lure has a body shaped like an elliptic parabaloid. A hook is mechanically coupled to the body and to an egg sinker wherein the egg sinker is proximate one end of the body. A sealer is configured to cover the body and the hook. The egg sinker causes the body to sink mimicking a fish diving. The body is configured to have the rocking motion when moving mimicking the fish swimming.

In some embodiments, the body has a height, a length and a width. The length is twice the height and the width is eight thirds of the height.

In some embodiments, the hook is parallel to the elliptic parabaloid forming a parabola. The parabola has a focal point which is tangent to a tangent line and the hook extends upward from the tangent line at an angle wherein the −45° is less than the angle which is less than 45°.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

Figure 1:
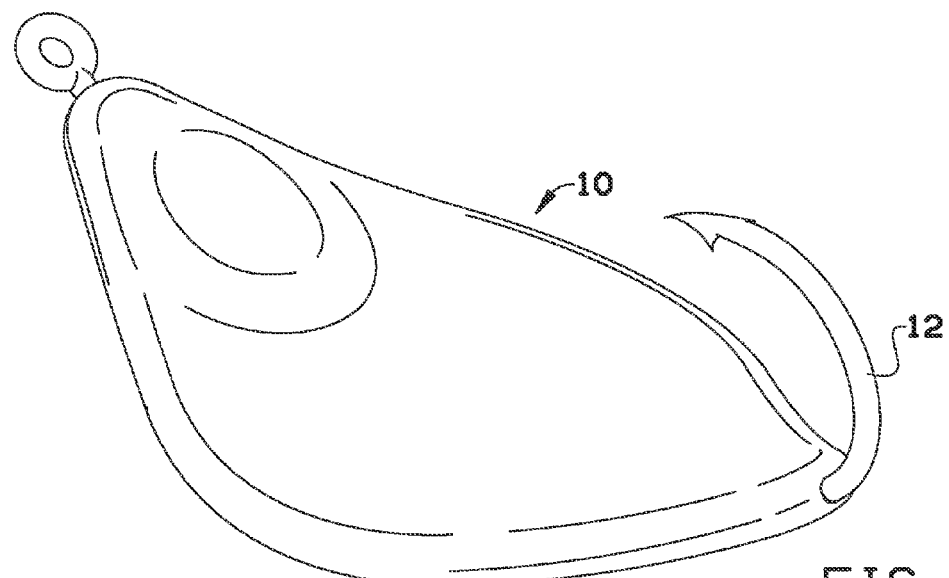
FIG. 1: is a top perspective view of an embodiment of the invention.
Figure 2:
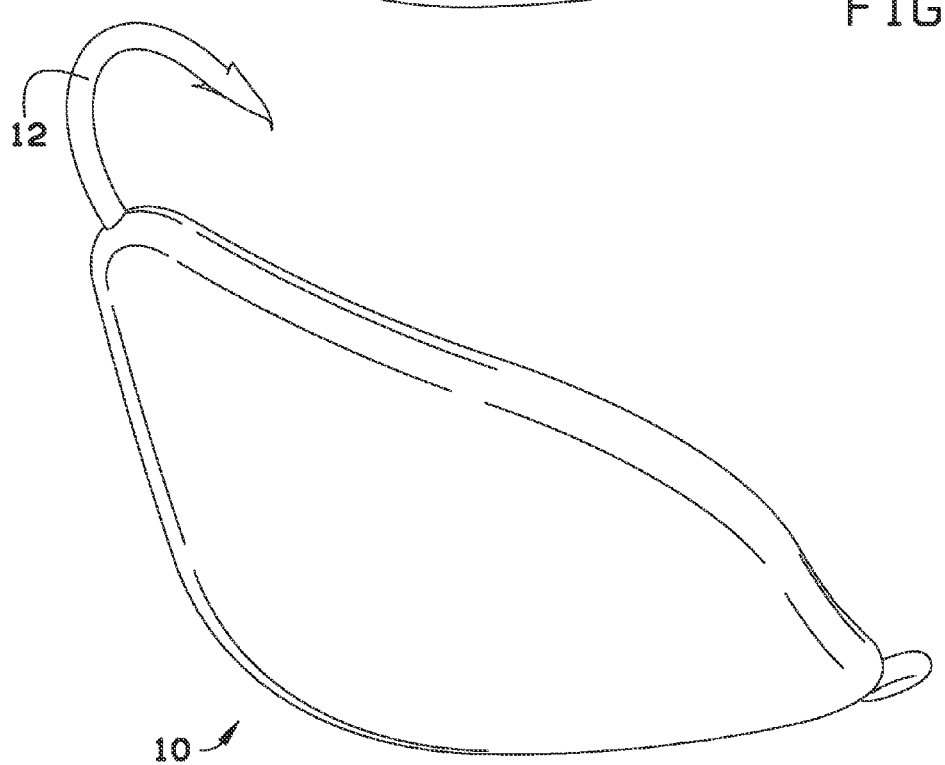
FIG. 2: is a bottom perspective view of an embodiment of the invention.
Figure 6:
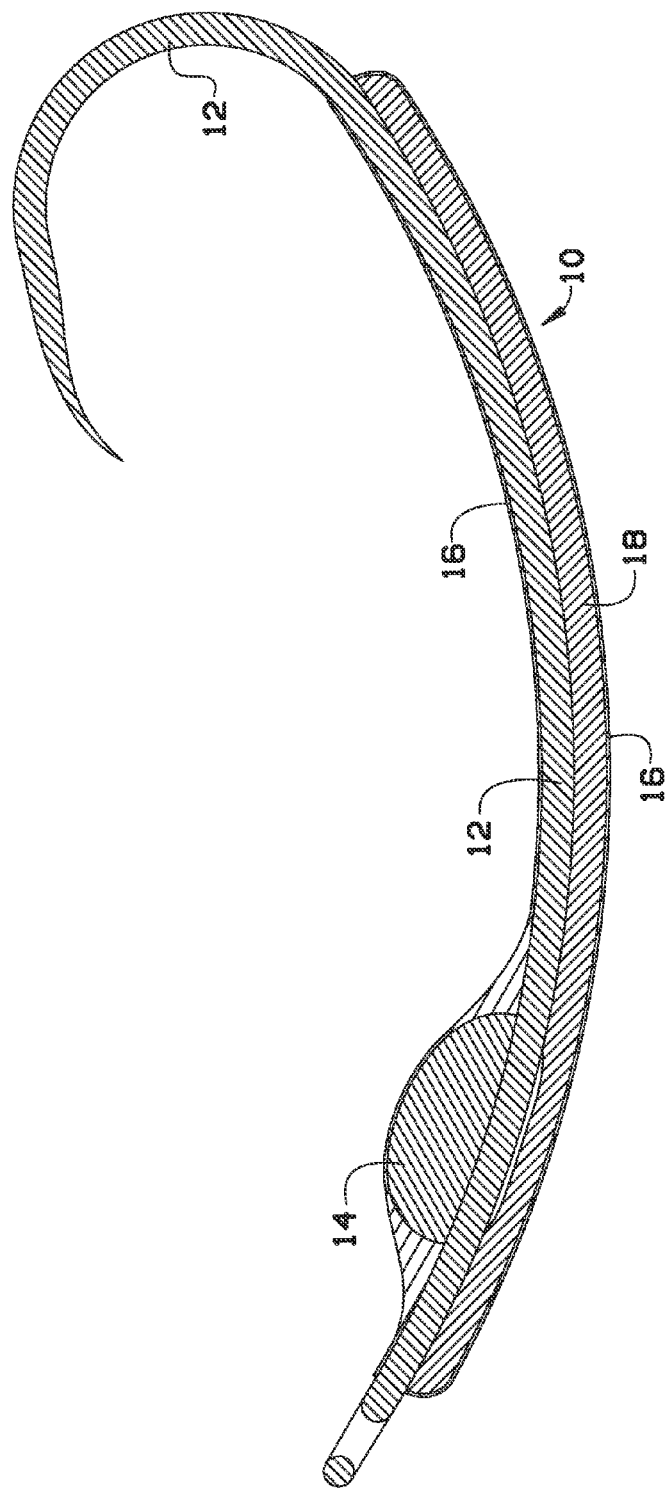
FIG. 6: is a section view of an embodiment of the invention alone line 6-6 in FIG. 4.

By way of example, and referring to FIG. 1 and FIG. 6, one embodiment of fishing lure 10 comprises hook 12 mechanically coupled to egg sinker 14. Hook 12 is further mechanically coupled to body 18 such that egg sinker 14 is proximate one end of body 18 and then covered with sealer 16. Egg sinker 14 solves the problem created by the dinky permitting fishing lure 10 to sink.

Figure 3:
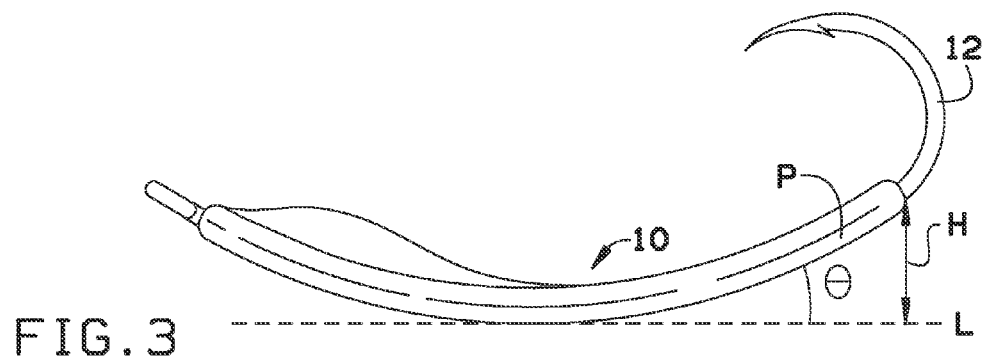
FIG. 3: is a side view of an embodiment of the invention.
Figure 4:
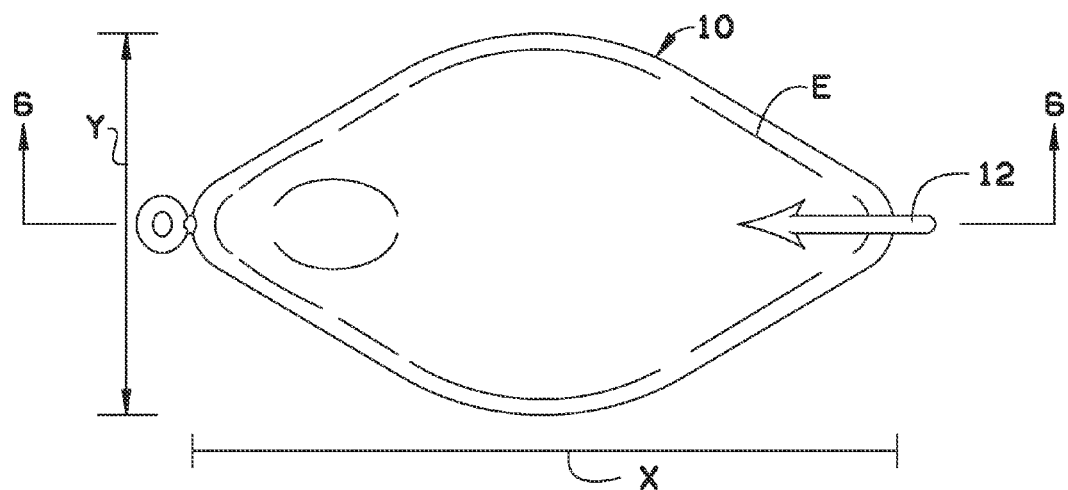
FIG. 4: is a top view of an embodiment of the invention.
Figure 5:
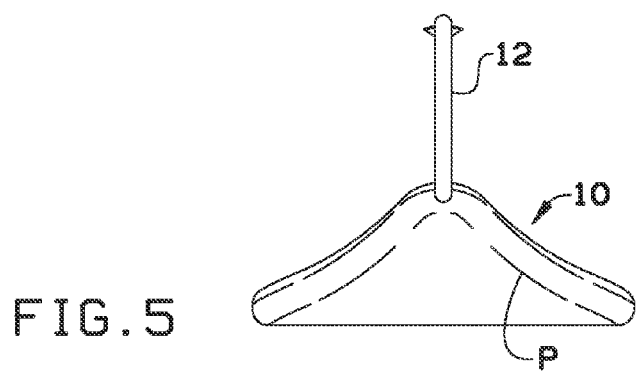
FIG. 5: is a front view of an embodiment of the invention.

Turning to FIG. 3, FIG. 4 and FIG. 5, body 18 generally takes the shape of an elliptic parabaloid wherein a cross section in the x-direction is a parabola P, a cross section in the y-direction is an ellipse E, and a cross section in the z-direction is a parabola P. The elliptic parabaloid is configured to rotate about a central axis.

The central axis coincides with hook 12 where hook 12 has a loop attached to a shank which is further attached to barb. Hook 12 has a parabolic shape parallel to the elliptic parabaloid. To effectively spin, hook 12 should extend upward from tangent line L, which travels through the focal point of the parabola defining hook 12, at an angle $\theta$ where $-45°<\theta<45°$.

Turning to FIG. 6, fishing lure 10 can be made with the general technology disclosed in the '081 application. However, to obtain a rocking motion that mimics a fish swimming, dimensions will need to be within the following parameters: Length Y should be about twice the value of Height H. Width X should be about eight thirds the value of Height H. In one embodiment, Height H can be ¾ inch, making Length Y 1.5 inches and Width W 2 inches. Of course, minor variations can be effective as well.

Colors, and color combinations can vary depending on the water qualities where fishing lure 10. Dark colors, predominately black, are preferred for muddy darker waters to give the lure a shadow appearance. Reflective bright colors are preferred for light waters such as those that are clear or sunlit waters. Colors and color combinations can be utilized to aid lure 10 visibility in various water qualities.

When fishing with fishing lure 10 in shallow waters of four inches to eight inches, sight casting is a must. Fishing lure 10 flashes in the water and can be observed as it crosses over grassy shallow areas and slightly deeper pothole areas. The elliptical parabolic shape design gives resistance for a slow retrieval and egg sinker 14 gives negative buoyance to keep the spoon down and give the lure the ability to fall into the deeper areas, simulating a fish diving. Body 18 can be either dead sticked (jigged) or straight retrieved. When water is shallow one can see the backs of the fish as they track body 18. At that time slow the retrieval more so the fish can hit body 18.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A fishing lure configured to have a rocking motion when pulled through water; the fishing lure comprising:
   a body shaped like an elliptic parabaloid;
   a hook mechanically coupled to the body; wherein the hook is parallel to the elliptic parabaloid forming a parabola wherein the parabola has a focal point which is tangent to a tangent line and the hook extends upward from the tangent line at an angle wherein −45° is less than the angle which is less than 45°;
   an egg sinker, attached to the hook; wherein the egg sinker is proximate one end of the body; and
   a sealer configured to cover the body and the hook;
   wherein the egg sinker causes the body to sink mimicking a fish diving;
   wherein the body is configured to have the rocking motion when moving mimicking the fish swimming.

2. The fishing lure of claim 1, wherein the body has a height, a length and a width wherein the length is twice the height and the width is eight thirds of the height.

* * * * *